(12) United States Patent
Othmer et al.

(10) Patent No.: US 8,391,447 B2
(45) Date of Patent: Mar. 5, 2013

(54) VISUAL VOICE MESSAGING STATE SYNCHRONIZATION

(75) Inventors: Konstantin Othmer, Mountain View, CA (US); Michael P. Ruf, Parkland, FL (US)

(73) Assignee: Smith Micro Software, Inc, Aliso Viejo, CA (US)

( * ) Notice: Subject to any disclaimer, the term of this patent is extended or adjusted under 35 U.S.C. 154(b) by 787 days.

(21) Appl. No.: 12/325,938

(22) Filed: Dec. 1, 2008

(65) Prior Publication Data

US 2009/0180598 A1    Jul. 16, 2009

Related U.S. Application Data

(63) Continuation-in-part of application No. 11/415,770, filed on May 2, 2006, now abandoned.

(51) Int. Cl.
 *H04M 1/64* (2006.01)
(52) U.S. Cl. ............... 379/88.12; 379/88.11; 379/88.25
(58) Field of Classification Search ............... 379/88.12, 379/88.17, 88.22–88.25, 88.11; 455/412.2, 455/413
See application file for complete search history.

(56) References Cited

U.S. PATENT DOCUMENTS

| | | | |
|---|---|---|---|
| 5,436,960 A | 7/1995 | Campana, Jr. et al. | |
| 5,481,597 A * | 1/1996 | Given | 379/88.23 |
| 5,621,727 A | 4/1997 | Vaudreuil | |
| 5,625,670 A | 4/1997 | Campana, Jr. et al. | |
| 5,684,862 A | 11/1997 | Finnegan | |
| 5,819,172 A | 10/1998 | Campana, Jr. et al. | |
| 5,963,618 A | 10/1999 | Porter | |
| 6,014,427 A * | 1/2000 | Hanson et al. | 379/67.1 |
| 6,067,451 A | 5/2000 | Campana, Jr. et al. | |
| 6,175,859 B1 * | 1/2001 | Mohler | 709/206 |
| 6,216,106 B1 * | 4/2001 | John | 704/270 |
| 6,219,694 B1 | 4/2001 | Lazaridis et al. | |
| 6,292,799 B1 | 9/2001 | Peek et al. | |
| 6,317,592 B1 | 11/2001 | Campana, Jr. et al. | |
| 6,333,973 B1 * | 12/2001 | Smith et al. | 379/88.12 |
| 6,411,685 B1 * | 6/2002 | O'Neal | 379/88.14 |
| 6,442,250 B1 * | 8/2002 | Troen-Krasnow et al. | 379/93.15 |
| 6,526,127 B1 * | 2/2003 | Piotrowski et al. | 379/88.22 |
| 6,539,077 B1 | 3/2003 | Ranalli et al. | |
| 6,625,260 B1 * | 9/2003 | Brockman et al. | 379/88.21 |
| 6,944,273 B2 * | 9/2005 | Huna | 379/88.14 |
| 6,987,840 B1 | 1/2006 | Bosik et al. | |

(Continued)

FOREIGN PATENT DOCUMENTS

| | | |
|---|---|---|
| EP | 1613045 A1 | 1/2006 |
| WO | 2007-131060 A2 | 11/2007 |

OTHER PUBLICATIONS

U.S. Appl. No. 11/415,770, filed May 2, 2006, Othmer.

(Continued)

*Primary Examiner* — Simon Sing
(74) *Attorney, Agent, or Firm* — Workman Nydegger

(57) ABSTRACT

Managing shared voice messages across the multiple voice messaging systems of the various recipients of a message. A server may act as a gateway and may interact with the multiple voice messaging systems and multiple user devices of the recipients. The server may retrieve voice messages from the sender voice messaging system and may transmit the voice message to the disparate voice messaging systems of the recipients with or without user assistance. The voice messages may be transcoded as necessary. The server then may determine the status of the voice message in the voice messaging systems of the recipients and may update the message status in the sender's and the recipients' voice message systems accordingly.

25 Claims, 4 Drawing Sheets

U.S. PATENT DOCUMENTS

| | | | |
|---|---|---|---|
| 6,999,566 B1 * | 2/2006 | Eason et al. | 379/88.22 |
| 7,013,155 B1 | 3/2006 | Ruf et al. | |
| 7,027,567 B1 * | 4/2006 | Scott et al. | 379/88.12 |
| 7,225,230 B1 * | 5/2007 | Knoerle et al. | 709/206 |
| 7,251,480 B1 | 7/2007 | Oh et al. | |
| 7,254,612 B2 | 8/2007 | Green et al. | |
| 7,738,637 B2 | 6/2010 | Schmandt et al. | |
| 7,885,392 B2 * | 2/2011 | Fujita-Yuhas | 379/88.25 |
| 2004/0042595 A1 * | 3/2004 | Davis et al. | 379/88.22 |
| 2004/0078443 A1 | 4/2004 | Malik | |
| 2005/0129191 A1 | 6/2005 | Kokko et al. | |
| 2006/0018444 A1 | 1/2006 | Pantana et al. | |
| 2006/0025114 A1 | 2/2006 | Bales et al. | |
| 2006/0146989 A1 | 7/2006 | Janssen | |
| 2006/0177024 A1 | 8/2006 | Frifeldt et al. | |
| 2007/0274465 A1 | 11/2007 | Othmer | |
| 2007/0280439 A1 | 12/2007 | Prywes | |

OTHER PUBLICATIONS

U.S. Appl. No. 12/878,252, filed Sep. 9, 2010, Othmer et al.
International Search Report and Written Opinion, mailed Jun. 24, 2010, as issued in connection with corresponding Patent Application No. PCT/US2009/066256, filed on Dec. 1, 2009.
Extended European Search Report dated Jul. 8, 2012 for EP 09 83 0983.
U.S. Appl. No. 13/547,268, filed Jul. 12, 2012, Othmer.
U.S. Appl. No. 11/415,770, filed Jun. 12, 2008, Office Action.
U.S. Appl. No. 11/415,770, filed Dec. 22, 2008, Final Office Action.
U.S. Appl. No. 11/415,770, filed Sep. 3, 2009, Office Action.
U.S. Appl. No. 11/415,770, filed Jun. 9, 2010, Restriction Requirement.
U.S. Appl. No. 12/878,252, filed Jul. 23, 2012, Office Action.

* cited by examiner

VISUAL VOICE MESSAGING STATE SYNCHRONIZATION

CROSS REFERENCE TO RELATED APPLICATIONS

This application is a continuation-in-part of U.S. application Ser. No. 11/415,770 filed May 2, 2006 and entitled PROVIDING UNIFIED ACCESS TO VOICE MESSAGES FROM DISPARATE SYSTEMS, which application is incorporated by reference in its entirety.

BACKGROUND OF THE INVENTION

1. Field of the Invention

The present invention relates to electronic messaging including voice messaging systems. More particularly, embodiments of the invention relate to systems and methods for synchronizing messages across multiple recipients of the messages using disparate voice message systems.

2. Related Technology

Communication is an important part of everyday life and many individuals use more than one electronic device to communicate with others. Home telephones, office telephones, cellular telephones, and computers are examples of devices used by individuals to communicate. These devices enable individuals to communicate using, for example, voicemail, email, and instant messages.

Advantageously, many of these devices provide features that enable users to communicate at the convenience of the sender and/or the recipient. A sender of an email, for example, can send an email that is delivered directly to the mail box of the recipient. Similarly, a recipient of an email has control over when he or she opens or replies to the received email. Further, email users can easily set up their email accounts to forward received emails to other accounts. In addition, replying to email is easy and works universally. The reply address is included in the email message, so the receiving email system can easily address a reply to the originator.

While email can typically be used and synchronized across disparate email systems, voicemail cannot be easily managed or synchronized in the same way. Voicemail enabled devices have much more difficulty in coordinating voice messages. For instance, a user that has both an office voicemail box and a personal wireless voicemail box is typically required to access each system independently in order to retrieve the various voicemails that the user has received.

Further, forwarding messages between voicemail systems is generally not supported. Users can forward messages when both the sender's voicemail box and recipient's voicemail box are within the same voicemail system. However, it is not possible for a sender to forward a message to another voicemail box unless the intended recipient is on the same voicemail system. For example, if a user receives a voicemail message that he would like to share with a friend who uses a different voicemail system, today it is not technically possible to send that message to the friend.

Sending a reply message in response to a received voicemail message presents a similar problem. Today's voicemail messages have only one address—the caller's phone number in the case when caller ID is enabled. Since there is no standardized way to send a voice message to a phone number, there is no general mechanism in place that permits a user of a system to reply to a voice message with another message unless the originating caller is on the same voicemail system as the recipient. This forces the recipient to place a call to the original caller, which may not be what the recipient wants or needs to do, to answer a simple question, for example.

Another problem arises in situations where a single voicemail message is sent to an inbox, such as a common "auto-attendant" inbox, that is shared by multiple recipients. When a message is sent to the shared inbox, the message is pushed or synchronized to the multiple recipients' individual devices. Because the message is shared, however, once one recipient listens to the message, the message is designated as "heard" for all the recipients that have received the message, even though only one recipient has actually listened to the message. Thus, the inbox reflects the status of the message with reference to only one message recipient, rather than taking into account the status of the message in relation to each intended recipient.

As these examples show, the problem with voicemail systems is the lack of interconnect between the systems, making them useful only to act in the capacity of recording and delivering a message to a single recipient. A second problem exists in that checking messages is a very slow, linear process, and can involve each user dialing into several voice systems to retrieve all the user's messages. A need in the art exists for systems and methods that enable multiple users to manage their individual and shared messages including voice messages across disparate systems, and reply to, forward, or delete those messages just as the user manages email.

SUMMARY

These and other limitations are overcome by embodiments of the invention, which relate to managing voice messages including instant voice messages (also referred to herein as Vnotes). In one embodiment, an instant voice message, or Vnote, is a voice message that can be sent to more than one recipient without calling or dialing the recipients. For example, a user can select a number of contacts, record a voice message and then send the message to the recipients without dialing or placing a call to each individual recipient. The recipients can then retrieve or listen to the message at their leisure. Vnotes are described in U.S. Pat. No. 7,013,155, which is hereby incorporated by reference.

Embodiments of the invention synchronize message status across a number of recipients' disparate voicemail systems. A messaging service pulls voice messages from participating voicemail systems and transmits the voice messages to the intended recipients. The messaging service then updates the status of the voice messages for each recipient of the shared messages at all relevant voicemail systems based on the actions of each recipient at different devices and/or voicemail systems. Embodiments of the invention also enable the recipients to reply to their received voice messages in multiple ways from their disparate voicemail systems.

In one embodiment a server provides a gateway that interfaces with voicemail systems and with user devices. The server manages voice messages across a plurality of recipients' disparate voicemail systems. In one example, a sender uses a voicemail system to send a voice message to multiple recipients. A server, acting as a gateway, then transmits the voice message to the voicemail systems of each recipient or to the recipients' devices. The message is transcoded to the appropriate format when necessary. Next, the server updates the status of the transmitted message at each recipient's voicemail system. For example, actions performed by a recipient at a device with respect to the transmitted message are monitored by the server or reported to the server by the device. The server can then update the status of the voice message in the originating voicemail system.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Embodiments of the invention relate to systems and methods for providing shared access to voice messages and more particularly to a messaging system for managing voice messages sent to a number of recipients across multiple voice messaging systems. Managing voice messages across disparate or unrelated voice message systems enable the recipients to interact (retrieve, play, replay, save, forward, delete, reply, etc.) with the shared voice message from any device or system. The messaging service synchronizes the altered status of voice messages across the user's disparate voicemail systems. Embodiments of the invention also enable users to reply to voice messages in multiple ways, for example by voice, email, or instant messaging.

The messaging service may include a visual voice messaging service that allows a user to visually track the status of any messages that he or she has received or sent. Additionally, the messaging service includes a voice messaging server that interacts with disparate voice message systems to provide a unified method for managing shared voice messages.

Through the messaging servers, users are able to synchronize shared voice messages, receive shared voice messages, individually reply to the shared voice messages in various ways, and the like across the users' disparate voice message systems. A user may also send a reply to a voice message using a Vnote, an email, or other form of communication.

Embodiments of the invention may include the use of Vnotes. In a conventional system, a caller is required to place a call to a recipient and the caller is directed to the recipient's voicemail box only when the recipient does not answer. The caller can then record a voice message that is stored in the recipient's voicemail box. A Vnote, in contrast, can be generated and sent to the recipient without placing a call to the recipient. Further, a Vnote may be stored on a server rather than in the recipient's voicemail box.

Figure 1:
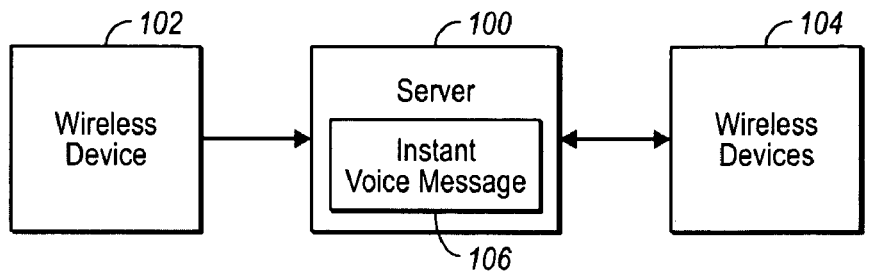
FIG. 1 is a block diagram illustrating a server that delivers Vnotes from a sender device to a plurality of recipient devices.

FIG. 1 illustrates one embodiment of a Vnote and the delivery of the Vnote. A caller can operate the wireless device 102 to generate a Vnote 106. This may include identifying a recipient or group of recipients of the Vnote from a contact list, for example, or speaking the names of the recipients in some instances. The caller can then simply speak the Vnote, which is directly transmitted to the server 100 by the device 102 or recorded by the device 102 and sent to the server 100 at a later time. In either case, the Vnote 106 is transmitted to the server 100, which stores the Vnote 106.

The server 100 then considers a plurality of recipient wireless devices 104a. If a first recipient wireless device 104 is enabled for Vnotes, the Vnote 106 can be transmitted directly to the first recipient wireless device, without calling the first recipient wireless device. The recipient/user of the first recipient wireless device 104 may be visually notified, for example, that a Vnote has been received by the first recipient wireless device. If a recipient wireless device 104 is not enabled to receive Vnotes, then a text message (such as an SMS message) may be generated by the server 100 and sent to the recipient wireless device. The text message may include a telephone number that the recipient/user can call in order to listen to the Vnote 106. The text message may also include an address for a website that the recipient may connect to in order to listen to the Vnote 106. In this manner, a device 102 can use Vnotes to communicate with a large number of recipients who use disparate voice messaging systems and devices. In another configuration, the device 102 may also call a recipient and leave the voice message in a recipient's voicemail box.

Figure 2:
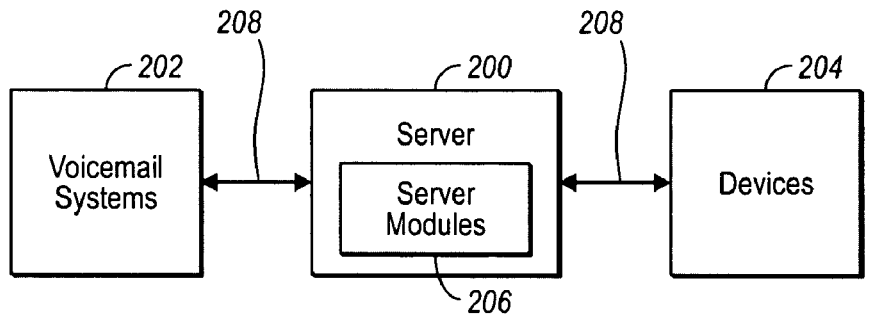
FIG. 2 illustrates one embodiment of a server than manages voice messages across disparate voicemail systems for multiple devices.

FIG. 2 is a block diagram illustrating exemplary systems and methods for managing shared messages, including Vnotes, across the disparate voicemail systems of the plurality of recipients of the shared message. The server 200, which is one embodiment of the server 100 in FIG. 1, functions as a gateway between the plurality of voicemail systems 202 and devices 204. The communication 208 between the voicemail systems 202 and server 200 and the communication 210 between the devices 204 and the server 200 can be wired and/or wireless communication. In addition, the communication 208 and 210 can be IP based, RF based, or may rely on other protocols such as VPIM, IMAP, or other proprietary protocol.

The voicemail systems 202 represent various types of voicemail systems. As a result, the management of voice messages may include a communication from one voicemail system to another voicemail system through the server 200. In this example, the server 200 interacts with all of the voicemail systems 202 and with the devices 204 to manage messages including Vnotes. Advantageously, embodiments of the invention enable voice messages generated in a particular PBX system to be delivered to a user of another, separate, PBX system.

Setting status of voice messages can be performed at different times by the server 200. The server 200 can track the progress of the shared voice message as it is transmitted from one voicemail system to another. The server 200 also monitors the various devices and voicemail systems that receive or process the voice messages. This enables the server 200 to set or change status at one voicemail system for an action that occurred on a separate device or in a separate voicemail system.

The server 200 accesses the voicemail systems 202 and sets status (read, forwarded, deleted, etc.) for each recipient's shared voicemail message. In one embodiment the server 200 may identify the status of the shared voice message on a first voicemail system and propagate the status of the voice message on the first voicemail system to the other voicemail systems of the other recipients of the shared message, in accordance with system and/or user preferences on those voicemail systems. Thus, for example, when a message is sent to a plurality of recipients, the server 200 may identify the status of the shared voice message in each recipient's voice messaging system and transmit the status of the shared message for a first recipient to the other recipients of the shared message and/or the sender of the shared message. Using this method, as described more fully below with reference to FIGS. 6A to 6C, the sender of the shared voice message can determine which recipients have retrieved the message and which recipients have not retrieved the message. Similarly, the status may be sent to the recipients of the shared message, so that the recipients can determine which other recipients have retrieved the shared message.

Further, the server 200 enables the user of a device 204 to determine the status of a voice message in a voicemail system 202. For example, the server 200 may access a first voicemail system and discover that the voice message has been successfully delivered. Then, as the voice message is retrieved in the first voicemail system by a first recipient, the server 200 can discover the updated status of the voice message in the first voicemail system. Similarly, the server 200 may access a second voicemail system in order to determine the status of the voice message in the second voicemail system. Further, as the voice message is retrieved by a first recipient, the server 200 may update the status of the voice message in the second voicemail system of a second recipient. Thus, any change in status of the voice message in the voicemail systems may be populated to the other voicemail systems by the server 200.

Thus, the status is applied, in one embodiment, to the voice message as it is delivered to each user's device. Alternatively, the server 200 can monitor the actions performed by the users with respect to a given message and, when an action occurs to change the message state at one voicemail system, update the state of the message across all the voicemail systems such that all systems are synchronized to reflect the current status of the voice message.

The server 200 can ensure that any status change to a voice message that results from any action performed by a user at the second voicemail box can be reflected on the same voice message in a first voicemail system. For example, a message may be received in a first user's voicemail box. The user may then use his cellular device to listen to and delete this voice message. The user's action of deleting a voice message from the cellular voicemail system is either monitored by the server 200 or is reported to the server 200 by the cellular device. When the server 200 becomes aware of the change in status to the deleted voice message, the server can access the voicemail boxes of the other recipients of the message in the plurality of voicemail systems in order to update the message state to reflect that the first user received and deleted the message. In this manner, the server 200 manages and synchronizes the voice message status to multiple users across disparate voicemail systems. Other changes in status can be similarly synchronized. Because the server 200 interfaces with all of the users' voicemail systems and devices, the server 200 can also continue to synchronize status when additional voicemail systems become involved or when a user replies to a voice message.

The server 200 has server modules 206 that, in addition to providing message synchronization as discussed above, provide the ability to reply to a voice message, regardless of which format the original voice message was received in. In other words, if a message is originally sent to and received at voicemail system A, while another copy of the message was sent to voicemail system B, the recipient of the message using voicemail system A can send a reply message to both the sender and to the user of voicemail system B. Because voice messages stored in different voicemail systems are often stored in different formats, the server modules 206 performs any transcoding that may be necessary to enable a target device to listen to and/or reply to a voice message.

The server modules 206 also provide mapping functionality, although some mapping may be implemented at the various devices 204. For example, a user that receives a voice message associated with a landline telephone number cannot typically send a reply voice message to a landline telephone (a call may be required). However, the user's device may include contact information indicating that a reply can be sent to a mobile device associated with the landline telephone number. Thus, the reply voice message can be sent to the sender's mobile device. The reply voice message can also be sent to the sender's email address as an attachment, for example. In some embodiments, both the original voice message and the reply voice message are Vnotes that do not require a user to place a call to the intended recipients.

Figure 3:
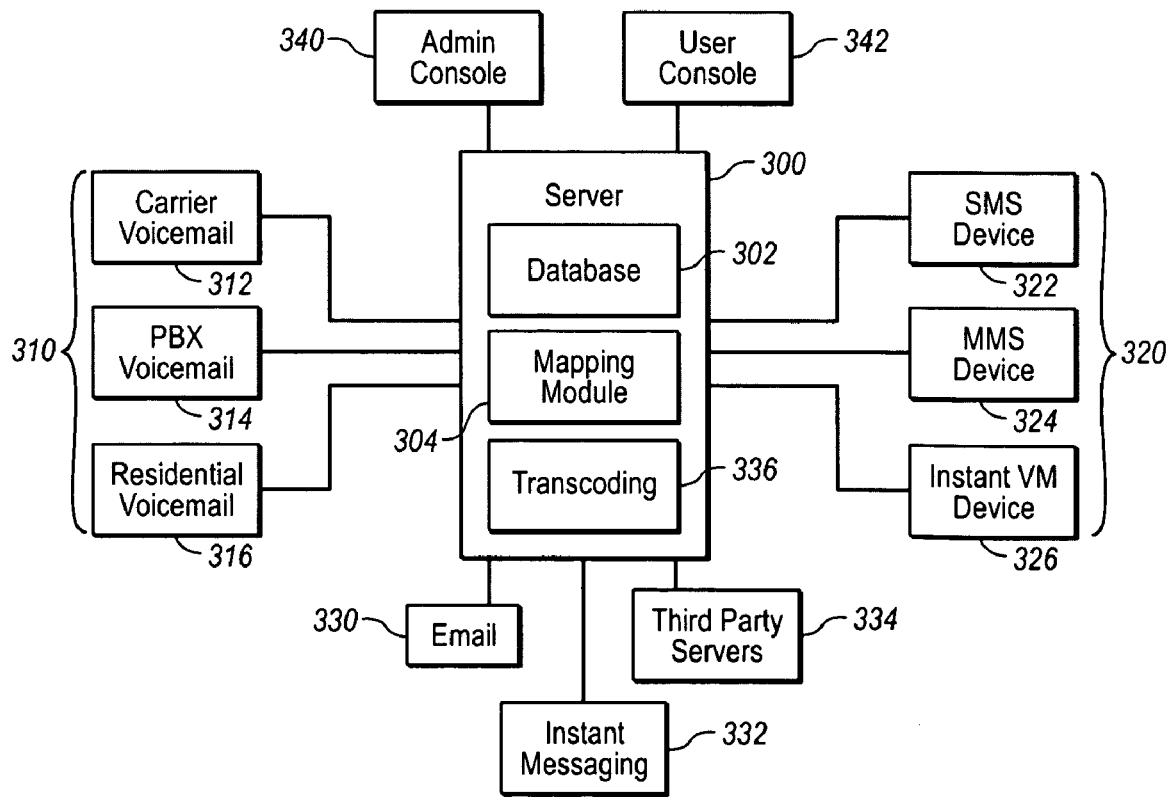
FIG. 3 is a block diagram illustrating one embodiment of a server that manages multiple voice message formats across multiple voicemail systems and illustrating systems and methods for replying to voice messages including voicemail, Vnotes or other methods including email.

FIG. 3 is a block diagram further illustrating the management of voice messages including Vnotes. The server 300, which is an embodiment of the server 100 shown in FIG. 1, interacts with the devices 320 and the voicemail systems 310. The admin console 340 enables an administrator to access the server 300 and perform administrative actions. Administrative actions include server management, setting default actions, administering gateways to the voicemail systems 310, and the like.

Through the user console 342, users can access the server 300 and set, for example, user preferences. User preferences may include defining rules that determine how the server 300 operates on the shared voice messages or changes the status of the users' shared voice messages at each of the voicemail systems 310. The rules may include, by way of example, setting a preferred voice message format or preferred target device, setting email addressing, providing mapping information used in addressing reply voice messages, specifying specific status settings in certain instances such as delete, and the like. In some instances, the rules or other settings can be stored on a user's device and/or the server 300.

In this example, the voicemail systems 310 of the various recipients of a shared message include one or more wireless-service-carrier voicemail systems 312, one or more PBX voicemail systems 314, and one or more residential-service-carrier voicemail systems 316. The wireless-service-carrier voicemail 312 is usually associated with a user's mobile device and the PBX voicemail 314 is the user's work voicemail system. The residential-service-carrier voicemail 316 may be at a user's residence. The devices 320 represent devices with various capabilities. The SMS device 322 is enabled for at least SMS communications. The MMS device 324 is enabled for at least MMS communications. The Vnote device 326 is enabled to receive at least Vnotes, which may include other media content. Each of the devices 320 may also be enabled to receive different types of messages. For example, the device 324 may be able to receive both SMS and MMS messages. Other devices may include a PBX telephone and the like. The device 320 may also include other devices such as, but not limited to, personal digital assistants, laptop computers, and the like.

In one embodiment, the server 300 manages voice messages by periodically polling the voicemail systems 310, although the voicemail systems 310 themselves may initiate the connection with the server 300 (such as when a new voice message is received). The ability of the server 300 to access these systems may be enabled when a user accesses the server through the user console 342 and provides the server 300 with the necessary credentials. As a result, the server 300 has access to the recipient's various voicemail boxes in disparate voicemail systems. When a status change is detected to any voicemail in any particular voicemail system, that status change can replicated in the other voicemail systems in which the user has access. As previously indicated, the status can be actively monitored by the server 300, and the various voicemail systems and devices may also initiate notice of the status change to the server 300.

For example, a sender may send a shared message to the voicemail systems 310. Then, a user may receive a voicemail at the PBX voicemail 314. The server 300, after polling the PBX voicemail 314 or after receiving a notice from the PBX voicemail 314, discovers that the new voicemail has been received by the PBX voicemail. Next, the voicemail is delivered as a Vnote to the user's device or as a voice message in an email 330 or in an instant message 332. If necessary, the server 300 performs transcoding 336 on the voice message before delivery to the user's device.

If the user listens to the new voicemail or to the Vnote and/or then deletes the voicemail or the Vnote at the user's device, the server 300 determines that the voicemail has been read and/or deleted from the PBX voicemail 314. The server 300 acts as a gateway by sending messages in a format that is acceptable to the disparate voice messaging systems of the recipients of the shared message, and in return, receiving updates from the disparate voice systems that are then sent to the sender in a format that is acceptable to the sender's voice messaging system. In some embodiments, the updates may also be sent to the other recipients of the voice message in a format acceptable to their respective voice messaging systems. In this manner, the server 300 can synchronize messages across the voicemail systems 310.

Embodiments of the invention also enable a recipient of a voice message to send a reply. Sending a reply to a voice message is inherently more difficult than sending a reply to an email, which usually has a built in reply address. Although the number related to the calling device may be associated with the voice message, that number does not necessarily correspond to the caller's voicemail box. A call from a PBX system that results in a voice message being stored in another voicemail box outside the PBX system, for example, often has a general number of the PBX system associated with the voice message. A reply voice message to the general number of the PBX system does not cause the reply voice message to reach the caller's voicemail box. Further, a number does not provide any information relating to the capabilities of the calling device. As a result, the ability to reply to a voice message is difficult to manage.

Figure 4:
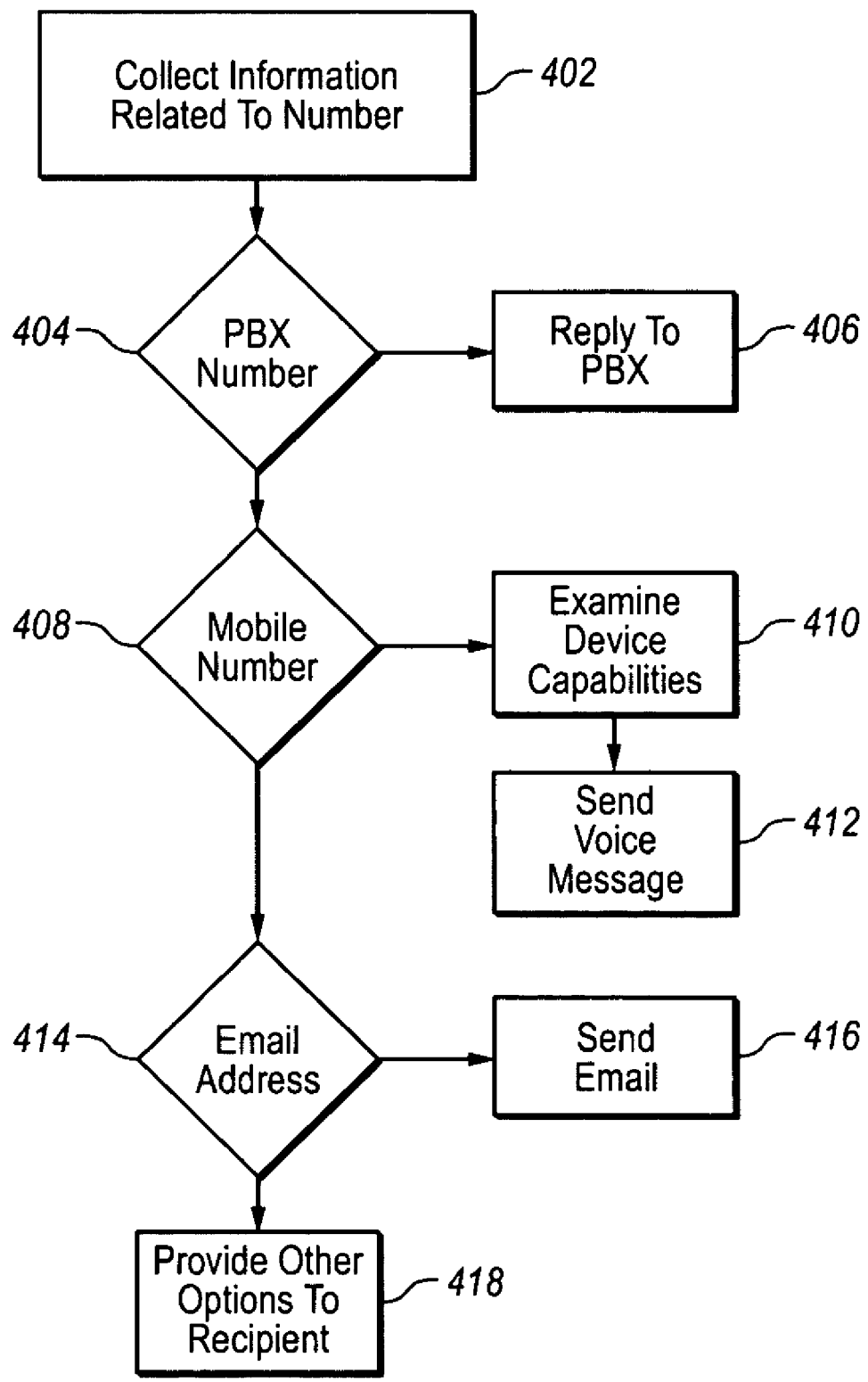
FIG. 4 illustrates one embodiment of a method for replying to a voice message from a sender device.

FIG. 4 illustrates an exemplary method for replying to voice messages including Vnotes. As previously described, a server 300 may send a Vnote, retrieved from a user's PBX voicemail system, to the user's mobile device. The Vnote often has a calling number associated with it, which may be stored at the server 300 or included in the Vnote.

If a recipient of the Vnote decides to send a reply Vnote, then either the recipient's device or the server or both device and server become involved in the generation of the reply voice message. This example begins by collecting 402 information relating to the calling number associated with the received voice message. This may be done by the server 300 as it retrieves a voice message from the originating voicemail box. If the calling number is a PBX number 404, then a reply voice message 406 can be generated and sent to the caller's PBX voicemail box. When the server 300 retrieves a voice message from a user's PBX voicemail box, the direct line is usually known to the server 300, which enables the server 300 to facilitate a reply to the PBX voicemail box.

For example, if the caller and the recipient are in the same PBX system, then the voice message received by the recipient's PBX voicemail box has the information needed to generate a reply to the caller's PBX voicemail box. The server 300 can detect that the recipient has a new voice message in the recipient's PBX voicemail box, and then deliver that message to the recipient's mobile device as a Vnote. The recipient can then generate a reply Vnote that is directed by the server 300 to the caller's PBX voicemail box via the recipient's PBX voicemail box. The server 300 typically performs any transcoding of the message that may be required to send a voice message stored in a PBX voicemail box as a Vnote to the recipient's mobile device, as well as transcoding the reply from the format of the mobile device to one acceptable to the PBX.

If the caller number is not a PBX number, but is determined to be a mobile device number 408, then the server can examine 410 the capabilities of the calling mobile device and send 412 a voice message based on those capabilities. For example, if the calling device is enabled for Vnotes, then a reply Vnote is sent to the calling device. If the calling device is not enabled for Vnotes, then an SMS or MMS message may be sent to the device. The SMS or MMS message may include instructions describing how the calling device can access the reply voice message, which may be stored by the server or on an IVR system associated with the server.

If the caller number is not a PBX number or a mobile number, the server or recipient device may determine if an email address 414 is available for the calling number. If an email address is available, the recipient has the option to send a text message to the email address, or to send a Vnote using email, that is, an email is sent 416 with the reply Vnote as an attachment. Likewise, if a PBX number or a mobile number is available for the caller, the reply can be sent back to either of those systems. If none of these systems are available for the caller, the recipient may be provided 418 with other options. The recipient may have the opportunity to call the caller directly if the calling number is, for example, a landline device.

Although FIG. 4 illustrates a particular order for determining how to send a reply to a voice message, one of skill in the art can appreciate that the method can be performed in another order. The order may be determined, in one embodiment, by default or by user preferences.

With reference to FIG. 3, the server also provides additional features to manage voice messages. The mapping module 304, for example, can be used to map PBX numbers in a database. As the database grows, the server 300 gains the ability to manage voice messages across disparate PBX systems. As a result, a user in one PBX system can generate a voice message including a Vnote that is delivered directly to the voicemail box of a user in a separate PBX system. The server can begin to build a database of numbers that are associated with specific PBX systems.

The transcoding module 336 enables the server 300 to accommodate the various features and capabilities of disparate voicemail systems 310 and devices 320. Providing a transcoding module 336 relieves the voicemail systems of the responsibility of ensuring message compatibility. The server 300 takes the responsibility of ensuring that a particular message is compatible with the receiving voicemail system or device in this example. The voicemail systems, however, are not precluded from generating voice messages in the appropriate format.

Further, the server can use email 330, instant messaging 332, and other third party services 334 to manage voice messages across multiple voicemail systems. For example, the mapping module 304 may indicate that voice messages from a given number or from a given PBX system, can be replied to using email. Thus, the mapping module 304 provides voice message routing capabilities.

In one embodiment, the address mapping capabilities can be performed at a device. The contact information for a given caller for example, may specify that reply voice messages are to be delivered as reply Vnotes to a specific mobile device, or are to be delivered in another specified manner.

Figure 5:
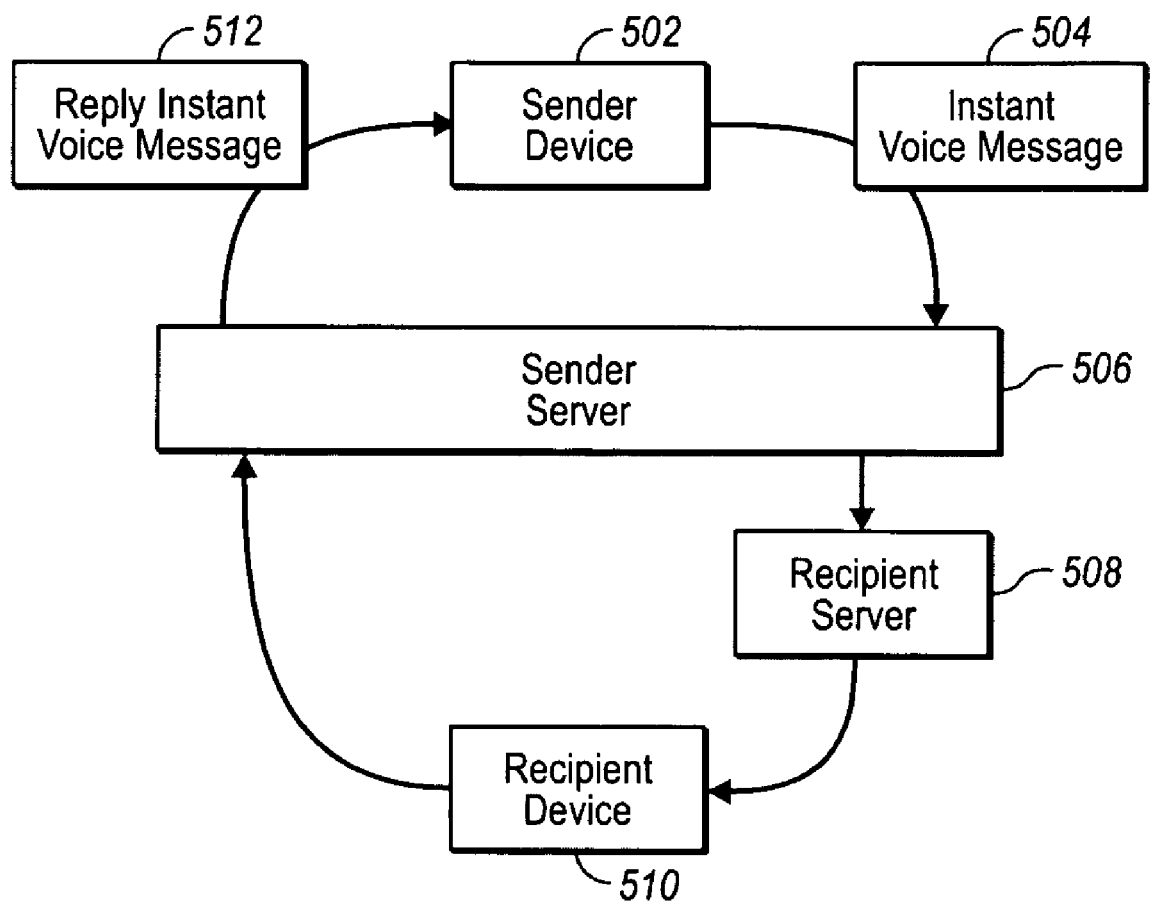
FIG. 5 depicts an exemplary method for sending and receiving a Vnote.

FIG. 5 illustrates an example of voice message management including the ability to reply to a Vnote. In this example, the sender device 502 creates a Vnote 504 that is delivered to the sender's server 506. The server 506 determines or already is aware that the recipient device 510 is not enabled to receive Vnotes. In this example, the server 506 thus transcodes the Vnote into a voicemail format and then sends the transcoded voice message to a recipient's server 508, which routes the voice message to the recipients voicemail. Alternatively, the sender's server 506 may store the message at an IVR server and send an SMS message to the recipient device 510 as previously described.

A recipient device 510 thus receives a voicemail. In one example, the sender's server 506 adds a tag to the voicemail that facilitates a reply. In this case, the recipient sends a voicemail reply message that is received by the sender's server 506. The server 506 transcodes the reply voice message into a reply Vnote 512 and delivers it to the sender device 502.

Figure 6A:
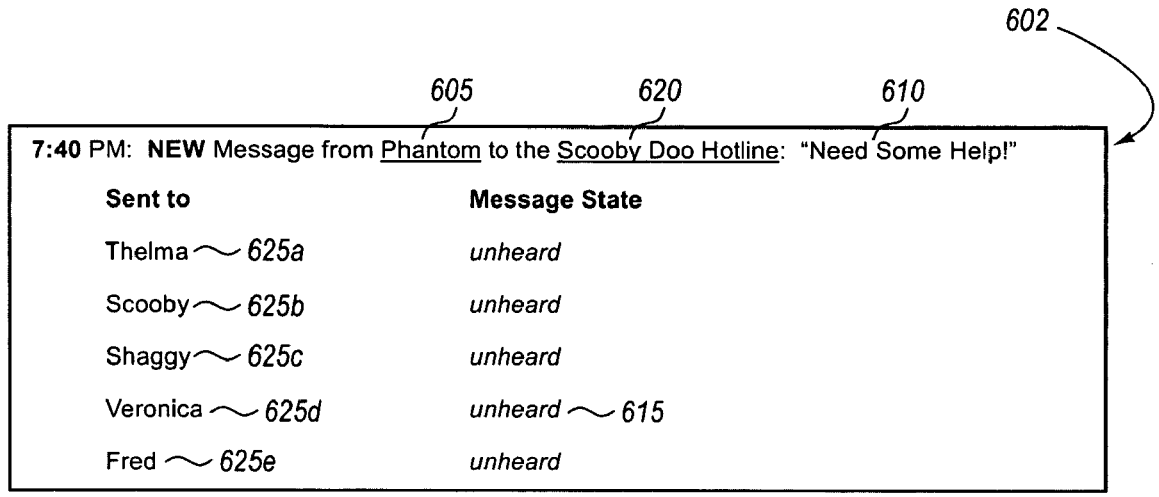
FIG. 6A illustrates an exemplary user interface displaying a status of a shared voice message.
Figure 6B:
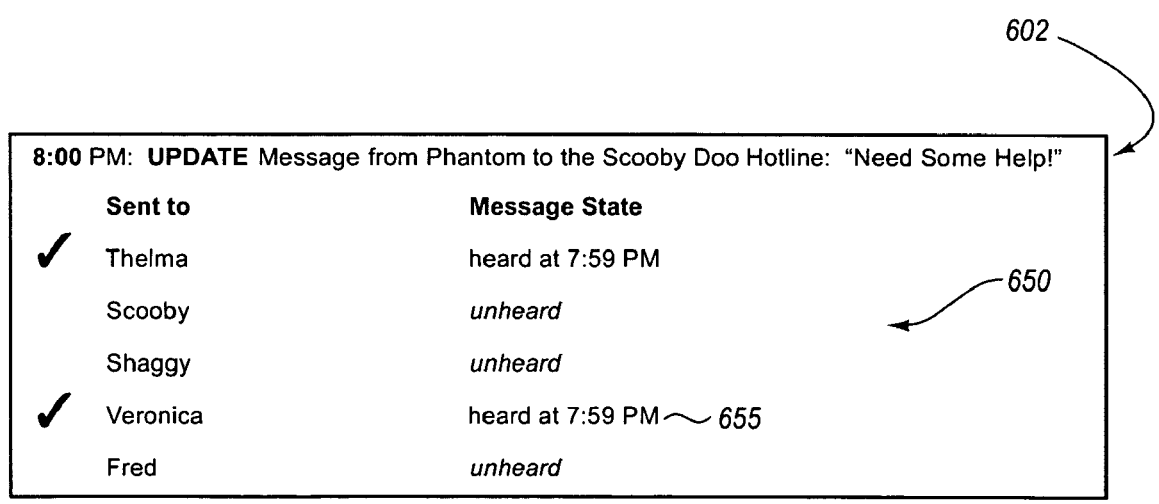
FIG. 6B illustrates the user interface displayed in FIG. 6A, illustrating an updated status of the shared voice message.

In order to illustrate one embodiment of the invention, FIGS. 6A and 6B illustrate an example of a user interface 602 for a shared voice message that is sent to a number of recipients using a voice messaging system. In this example, a sender 605 sends a message 610 to the "Scooby Doo Hotline" 620, which is an inbox that is shared by "Thelma" 625a, "Scooby" 625b, "Shaggy" 625c, "Veronica" 625d, and "Fred" 625e. When the message 610 is received in the shared inbox in the server, a notification is sent to the device of each member 625a-625e of the shared inbox indicating that they have received a new voice message 610. In the example shown in FIG. 6A, none of members 625a-625e have listened to the voice message 610, so the status of the message 610 is listed as "unheard" 615 for each member 625a-625e of the shared inbox.

FIG. 6B is an example of an update 650 from a voicemail delivery and synchronization process of some embodiments of the present invention, that enables the sender 605 and the individual recipients 625a-625e to track and synchronize the status of the message 610. Using embodiments of the invention more fully described above, the message 610 is received by a server of the system that acts as a gateway between the various voice messaging systems of the various recipients 625a-625e. Thus, as the voice message 610 is received by the server, the message is sent to each member 625a-625e of the shared inbox and then tracked. This process may involve transcoding or converting the message into a format that is acceptable to the voice messaging systems of each member 625a-625e. Once the voice message 610 is sent, the server then determines the status of the voice message 610 in each voice messaging system of the members 625a-625e. In this example, the server has determined that the status of the voice message 610 has changed to "heard" 655 in the voice messaging system of members 625a and 625d, and the server has sent an update 650 to the sender of the voice message 610 updating the status of the voice message 610. In some embodiments, the server may send the update 650 to the recipients 625a-625e of the voice message 610 so that they can monitor which other recipients 625a-625e have received the voice message.

In some instances when a recipient's voice messaging system is incapable of receiving a Vnote or voice message and the voice message is transcoded into an email, the transcoding process may deliver the voice message as an attachment in an email that includes a web beacon or bug that is embedded into the message, and that tracks whether the recipient has read the email, while typically remaining invisible to the recipient. Several web beacons are known in the art and any number of tracking mechanisms can be used in association with embodiments of the present invention.

In other instances, the transcoding process from a voice message into an email or other text based format may comprise sending a web address, where the voice message is temporarily stored. Using this configuration, the system is able to report not only that a recipient received the email with the voice message, as in the previous example, but also that the content of the voice message was retrieved. Thus, depending on the specific requirements of the system, the synchronization process may use various methods and systems known in the art to determine the status of a voice message in any given messaging system.

As shown above, a recipient device or an end-point device (such as, devices 322, 324, 326) may receive voice messages from a separate voice messaging system (such as, voicemail systems 312, 314, 316). If desired, however, all or at least a portion of a voice messaging system may reside on the recipient or end-point device (such as, the instant voice message device 326) and may interact with the server 300 as discussed above. For example, in some embodiments, the functionality of the recipient server 508 may reside in the recipient device 510, if desired.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, wireless communication devices, PDAs, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A method for managing shared voice messages across disparate voice messaging systems, the method comprising:
   transmitting a shared voice message from a sender to a plurality of voice messaging systems of a plurality of recipients, the plurality of voice messaging systems being independent from a voice messaging system of the sender;
   accessing the plurality of voice messaging systems of the plurality of recipients;
   retrieving the status of the shared voice message in the plurality of voice messaging systems of the plurality of recipients;
   transmitting the status of the shared voice message in the plurality of voice messaging systems to the voice messaging system of the sender;
   updating a status of the shared message in the plurality of voice messaging systems at the voice messaging system of the sender; and
   displaying the status of the shared message in a visual display to the sender.

2. The method of claim 1, wherein accessing the plurality of voice messaging systems includes providing credentials to the plurality of voice messaging systems.

3. The method of claim 1, further comprising updating the status of the shared message at the plurality of voice messaging systems when the shared voice message has been retrieved by a recipient of the shared message.

4. The method of claim 1, wherein transmitting the shared voice message to the plurality of voice messaging systems includes transcoding the shared voice message to a series of formats that are compatible with the plurality of voice messaging systems.

5. The method of claim 1, wherein transmitting the shared voice message includes transcoding the shared voice message to an instant voice message (Vnote).

6. The method of claim 1, wherein transmitting the shared voice message includes transcoding the shared voice message to a Short Message Service (SMS) or Multimedia Messaging Service (MMS) message.

7. The method of claim 1, wherein transmitting the shared voice message includes sending the shared voice message as an attachment in an email message.

8. A method for managing shared voice messages across disparate voice messaging systems, the method comprising:
   transmitting a shared voice message from a sender to a plurality of voice messaging systems of a plurality of recipients, the plurality of voice messaging systems being independent from a voice messaging system of the sender;
   accessing the plurality of voice messaging systems of the plurality of recipients;
   retrieving the status of the shared voice message in the plurality of voice messaging systems of the plurality of recipients;
   transmitting the status of the shared voice message in the plurality of voice messaging systems to the voice messaging system of the sender;
   updating a status of the shared message in the plurality of voice messaging systems at the voice messaging system of the sender;
   displaying the status of the shared message in a visual display to the sender;
   wherein transmitting the shared voice message includes sending the shared voice message as an attachment in an email message; and
   wherein the email message further comprises a web bug and updating the status of the shared voice message comprises using the web bug to determine if the recipient has opened the email message.

9. The method of claim 1, wherein transmitting the shared voice message includes sending a web address in an email message, the web address indicating where the user may retrieve the shared voice message.

10. The method of claim 1, wherein updating the status of the shared message in a voice messaging system includes updating the status in response to a user action.

11. The method of claim 10, wherein the user action comprises listening to an instant voice message (Vnote), deleting a Vnote, forwarding a Vnote, or replying to a Vnote.

12. The method of claim 10, wherein the user action comprises listening to a voice message on a mobile phone, deleting a voice message on a mobile phone, forwarding a voice message on a mobile phone, or replying to a voice message on a mobile phone.

13. A system for managing shared voice messages across disparate voice messaging systems, the system comprising:
- a voice messaging system of a sender configured to send a shared voice message from the sender, the shared voice message being addressed to a plurality of recipients;
- a plurality of voice messaging systems of the plurality of recipients, the plurality of voice messaging systems being independent from the voice messaging system of the sender; and
- a server configured to receive the shared voice message from the voice messaging system of the sender, transmit the shared voice message to the plurality of voice messaging systems of the plurality of recipients, determine the status of the shared voice message in the plurality of voice messaging systems of the plurality of recipients, and transmit the status of the shared voice message in the plurality of voice messaging systems to the voice messaging system of the sender;
- wherein the voice messaging system of the sender is configured to send the status of the shared voice message to a communications device of the sender, the communications device being configured to receive and display the status of the shared message in a visual display.

14. The system of claim 13, wherein the server is further configured to transcode the shared voice message to a series of formats that are compatible with the plurality of voice messaging systems.

15. The system of claim 13, wherein the server is further configured to transcode the shared voice message to an instant voice message (Vnote), Short Message Service (SMS) message, or Multimedia Messaging Service (MMS) message.

16. The system of claim 13, wherein the server is further configured to transcode the shared voice message and send the shared voice message as an attachment in an email message.

17. A system for managing shared voice messages across disparate voice messaging systems, the system comprising:
- a voice messaging system of a sender configured to send a shared voice message from the sender, the shared voice message being addressed to a plurality of recipients;
- a plurality of voice messaging systems of the plurality of recipients, the plurality of voice messaging systems being independent from the voice messaging system of the sender; and
- a server configured to receive the shared voice message from the voice messaging system of the sender, transmit the shared voice message to the plurality of voice messaging systems of the plurality of recipients, determine the status of the shared voice message in the plurality of voice messaging systems of the plurality of recipients, and transmit the status of the shared voice message in the plurality of voice messaging systems to the voice messaging system of the sender;
- wherein the voice messaging system of the sender is configured to send the status of the shared voice message to a communications device of the sender, the communications device being configured to receive and display the status of the shared message in a visual display;
- wherein the server is further configured to transcode the shared voice message and send the shared voice message as an attachment in an email message; and
- wherein the email message comprises a web bug and determining the status of the shared message comprises using the web bug to determine if the recipient has opened the email message.

18. The system of claim 13, wherein the server is further configured to transcode the shared voice message and send a web address in an email message, the web address indicating where the user may retrieve the shared voice message.

19. The system of claim 13, wherein the server is configured to determine the status of the shared voice message in response to a user action.

20. The system of claim 19, wherein the user action comprises listening to a an instant voice message (Vnote), deleting a Vnote, forwarding a Vnote, or replying to a Vnote.

21. The system of claim 19, wherein the user action comprises listening to a voice message on a mobile phone, deleting a voice message on a mobile phone, forwarding a voice message on a mobile phone, or replying to a voice message on a mobile phone.

22. A method for managing a shared voice message transmitted from a voice messaging system of a sender to a plurality of voice messaging systems of a plurality of recipients, the plurality of recipients including a first recipient and a second recipient, the method comprising:
- obtaining a first status of the shared voice message in a first voice messaging system of the first recipient, the first status indicating a user action taken by the first recipient with respect to the shared voice message, the first voice messaging system being independent from the voice messaging system of the sender;
- transmitting the first status to a second voice messaging system of the second recipient, the second voice messaging system being independent from the voice messaging system of the sender and the first voice messaging system;
- wherein the second voice messaging system is configured to send the first status to a communication device of the second recipient; and
- wherein the communication device is configured to display, in a visual display of the communication device, the first status and a second status, the second status indicating a user action taken by the second recipient with respect to the shared voice message.

23. The method of claim 22, wherein the first status is obtained in response the user action taken by the first recipient.

24. The method of claim 23, wherein the user action taken by the first recipient comprises listening to an instant voice message (Vnote), deleting a Vnote, forwarding a Vnote, or replying to a Vnote.

25. The method of claim 23, wherein the user action taken by the first recipient comprises listening to a voice message on a mobile phone, deleting a voice message on a mobile phone, forwarding a voice message on a mobile phone, or replying to a voice message on a mobile phone.

* * * * *